Aug. 23, 1932.  A. J. CAWLEY  1,872,677
SOUND RECORDING PROCESS
Filed Feb. 7, 1930
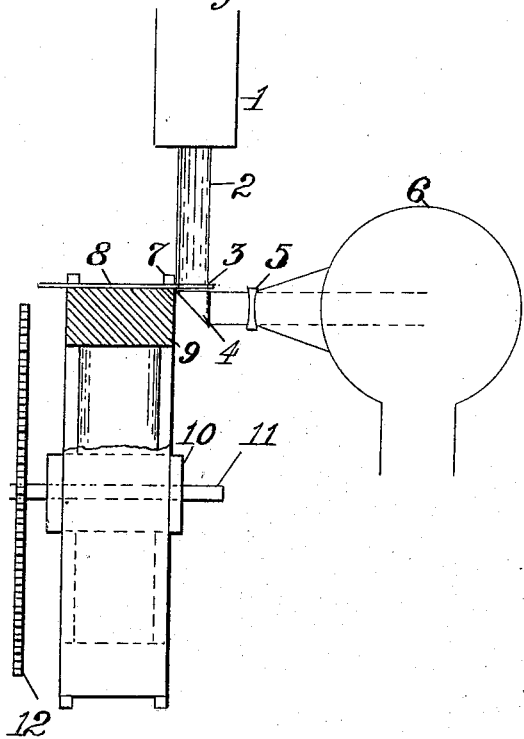
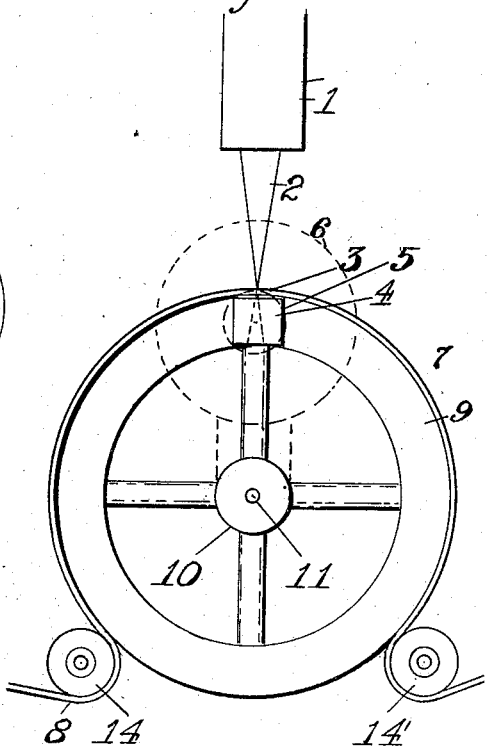
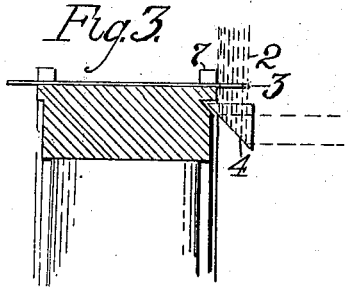
INVENTOR
Aloysius J. Cawley Patented Aug. 23, 1932

1,872,677

UNITED STATES PATENT OFFICE

ALOYSIUS J. CAWLEY, OF PITTSTON, PENNSYLVANIA

SOUND RECORDING PROCESS

Application filed February 7, 1930. Serial No. 426,713.

The invention relates generally to the recording of sound on photographic films and reproducing such sound records by means of a beam of light coacting with such records and a photoelectric cell.

More particularly, the invention is concerned with the proper direction and alteration of the light beam in order to obtain a better coaction of the beam with the photoelectric cell. The photoelectric cell is placed to one side of the film moving means, and a reflector is provided to turn the beam of light after it has traversed the photographic sound record in the direction of the photoelectric cell. A lens is provided in order to spread the light beam over the full photosensitive area of the photosensitive cell.

Reference is to be had to the accompanying drawing forming part of this specification, in which like reference characters have similar meanings in all of the views, and in which, Figure 1 is an elevational view of a film being photoelectrically reproduced, the beam being deflected to one side and cross-sectional area increased in order to reach all portions of the photosensitive element in the photoelectric cell.

Figure 2 is a side view of Figure 1.

Figure 3 is a cross sectional view of Figure 1, showing a modified arrangement of the light reflecting means.

Referring to Figure 1 in more detail, a wedge-shaped light beam is formed by means of the optical element 1, and this beam passes through the photographic sound record 3 carried on the film 8, being virtually the margin thereof. After beam 2 passes through sound record 3, it is reflected by the prism 4 into the photoelectric cell 6. This cell is placed to one side of the film moving wheel 9, mounted on shaft 11, its hub being shown at 10. This wheel is provided with the usual sprocket teeth 7. This wheel is narrowed in order to permit its margin which carries the sound record to overlap the edge of the wheel in order that light may be reflected through it.

A gear wheel for driving shaft 11 is shown at 12. It may or may not be used, as desired. In arrangements of the character just described, it is customary to place the photoelectric cell partly within the hollow of the wheel 9. This, however, does not permit the use of a very large photoelectric cell, and also does not permit the use of much of the photosensitive coating of such cells. It is also an unsymmetrical arrangement from the standpoint of rotation as compared to the symmetrical wheel shown at 9 in the attached drawing.

In the present invention beam 2, instead of pursuing a straight course downward after it has passed through sound record 3, is deflected to one side by means of a reflector 4, which may be a mirror or other means, but is here shown as a prism. The photoelectric cell is thus placed in a position where it may be readily inspected and repaired, and above all, where all of its photosensitive area may be acted upon by the light beam. Thus, the small beam of light 2 is spread out over as large as possible an area of the sodium, or other photosensitive coating of the cell. Also, the film moving means is of a very symmetrical character, thus insuring greater uniformity of speed.

Figure 2 illustrates the same apparatus as Figure 1 in side view. The beam is shown in a sharp line contact with the photographic sound record 3. 4 indicates the reflecting prism, while 5 shows the light spreading means, such as a concave lens which is placed between the observer and the prism. The dotted circle 6 indicates the photoelectric cell, which is placed nearer the observer. The heavy rim of the wheel is shown at 9 and by virtue of its mass and developed momentum imparts speed uniformity to the film. Contact rolls for holding the film in contact with the wheel are shown at 14 and 14'.

Figure 3 shows another of the modifications of the invention, and is intended to disclose the fact that prism 4 is placed in an indentation in the rim of wheel 9, and which moves the film having the photographic sound record on its margin. This has as its object the utilization of the full width of photographic sound record, in order to attain the greatest possible intensity of sound reproduction therefrom.

Having described my invention, I claim as new and desire to secure by Letters Patent:

1. In combination: means for moving a film bearing a photographic sound record on its margin at uniform speed, means for passing a light beam through said record, a prism underlapping all of said sound record and a small portion of said film moving means and acting to reflect said light beam to one side, and photoelectric means placed in the path of said reflected light beam and acting to convert the energy of said beam into speech-varied electric current.

2. In combination a narrowed wheel for moving a film bearing a photographic sound record on its margin, an optical element directing a light beam through said sound record, a prism underlapping said sound record in order to deflect to one side said light beam, and a photoelectric cell receiving and being actuated by said light beam in order to have its intensity of current varied in accordance with said sound record.

3. In combination: a sprocket wheel, a film bearing a photographic sound record engaging with and moved by said wheel, an optical element directing a light beam through said sound record in order to have the intensity of said beam varied in accordance with said sound record, a prism underlapping said sound record in order to deflect said beam upon a photoelectric call, and a concave lens for increasing the cross-sectional area of said beam in order to spread it over a greater area of the photosensitive surface of said cell.

4. In combination: a medium bearing a photographic sound record, a large rotating element acting to impart fixedness and uniform motion to said medium while engaging therewith, a photoelectric cell placed to one side of said rotating element, means for passing a beam of light through said sound record and a light reflecting means underlapping said sound record and acting to deflect said light beam into said photoelectric cell.

5. In combination: a medium bearing a photographic sound record, a heavy rotating element acting to impart uniform motion and fixedness to said medium while engaging therewith, a photoelectric cell placed to one side of said rotating element, means for passing a beam of light through said sound record, and a light reflecting means underlapping said sound record and acting to deflect said light beam into said photoelectric cell.

6. In combination: a flexible transparent medium, a heavy rotating element in engagement with said medium, the margin of said medium overhanging said rotating element, a light permeable sound record borne on said margin, means for passing a light beam through said margin and record, a reflecting element underlapping said margin and record, said reflecting element being in the path of and deflecting said light beam, and a photoelectric cell located in the path of and influenced by said deflected light beam to produce a sound modulated electric current.

Pittston, Pa., February 5, 1930.
ALOYSIUS J. CAWLEY.